No. 627,925. Patented June 27, 1899.
F. J. HAGEN.
HYDRAULIC MOTOR.
(Application filed Mar. 9, 1899.)
(No Model.) 2 Sheets—Sheet 1.
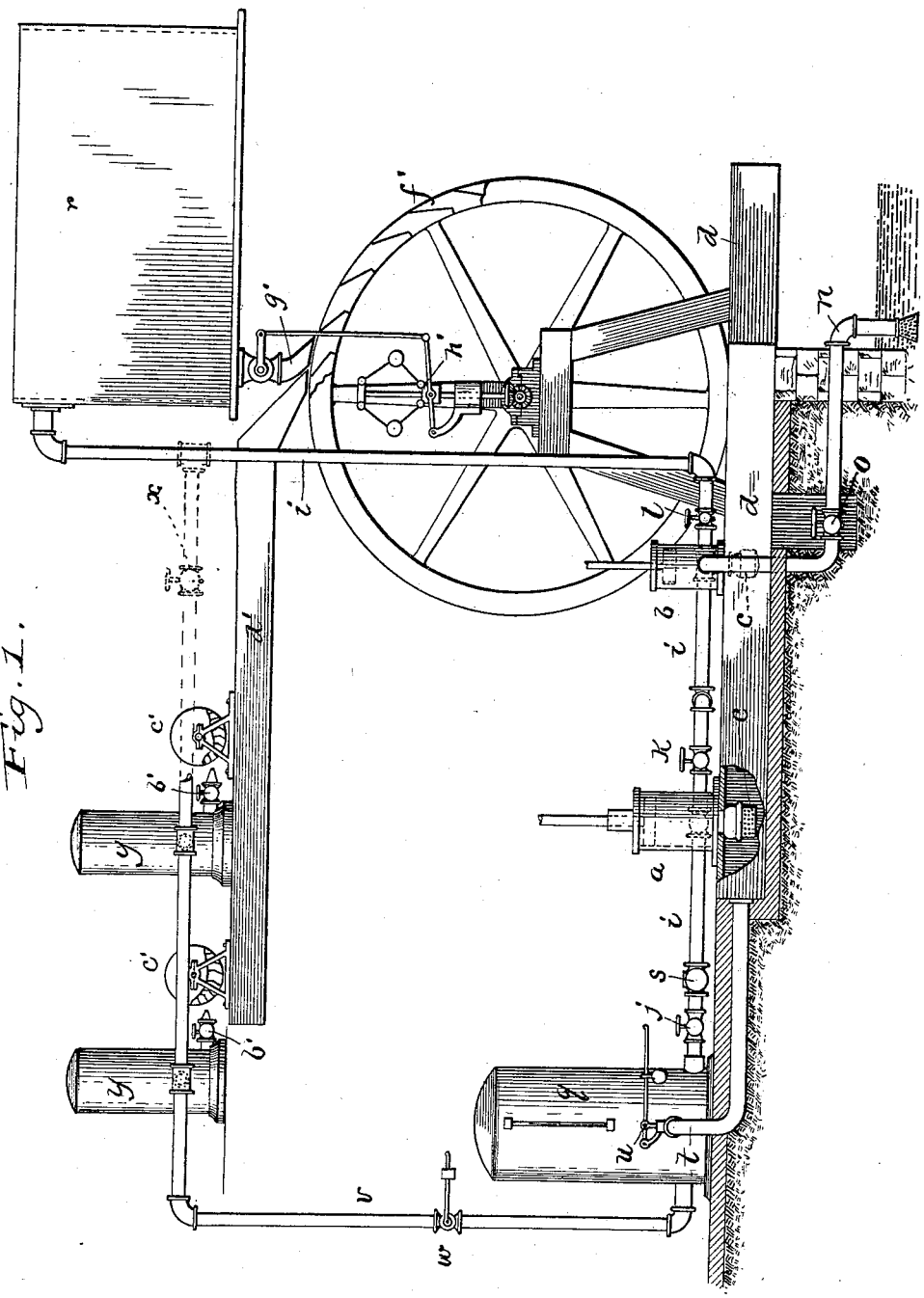

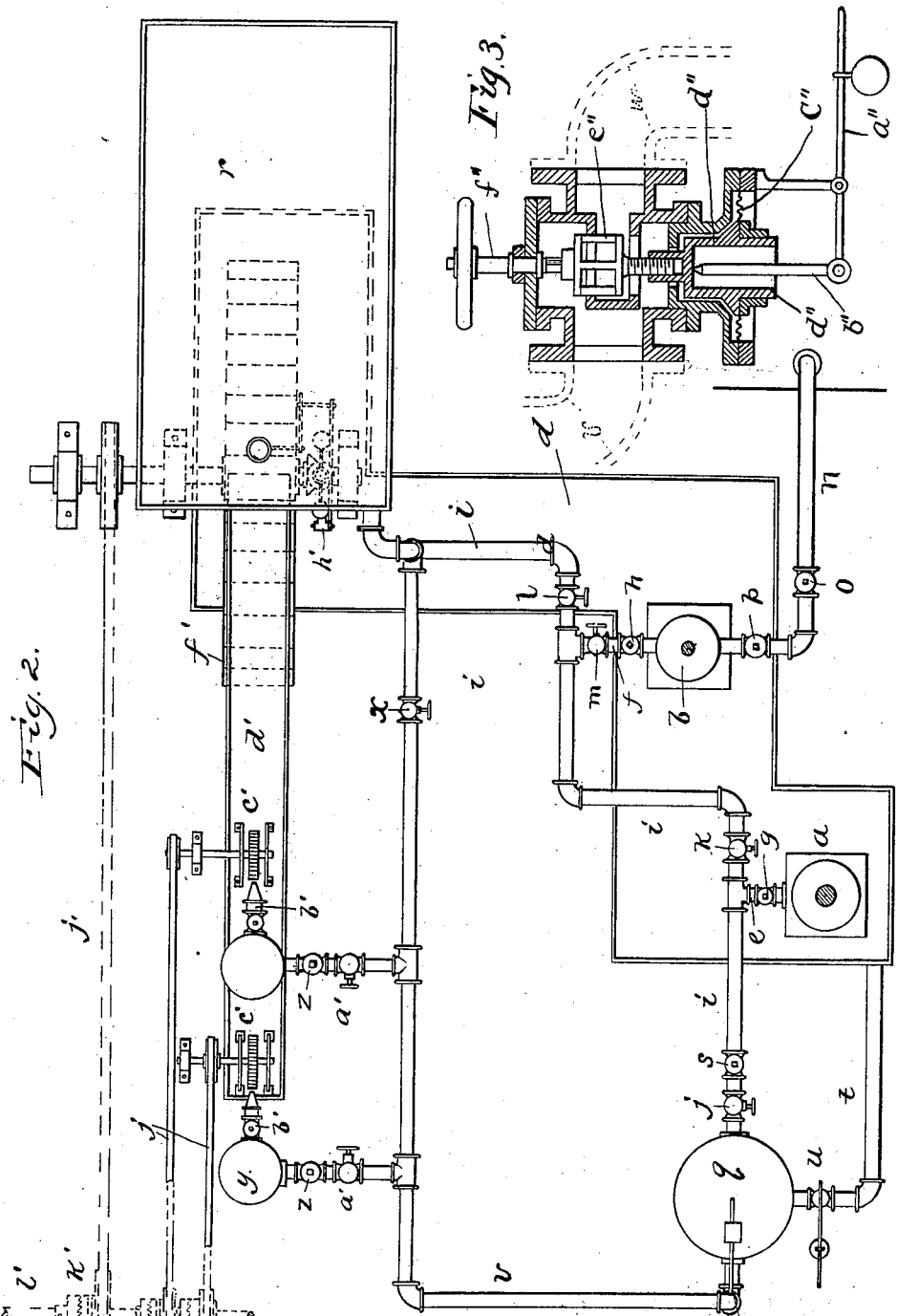

UNITED STATES PATENT OFFICE.

FERDINAND J. HAGEN, OF NEW YORK, N. Y., ASSIGNOR OF ONE-HALF TO BEN. H. HOMAN, OF SAME PLACE.

HYDRAULIC MOTOR.

SPECIFICATION forming part of Letters Patent No. 627,925, dated June 27, 1899.

Application filed March 9, 1899. Serial No. 708,387. (No model.)

*To all whom it may concern:*

Be it known that I, FERDINAND J. HAGEN, a citizen of the United States, residing in New York city, State of New York, have invented certain new and useful Improvements in Hydraulic Motors, of which the following is a specification, reference being had therein to the accompanying drawings.

The object of the invention is to provide a hydraulic apparatus adapted to store up and utilize for industrial purposes the varying energy of such powers as wave and tide powers, as more fully hereinafter set forth.

Figure 1 is a side elevation of my apparatus, partly in section; Fig. 2, a plan thereof, and Fig. 3 is a detail section of the reducing-valve.

Referring to the drawings by letters, $a$ and $b$ designate suitable pumps, preferably adapted to be operated by a wave and tide motor and for that reason located near a natural body of water. The suction heads or pipes $c$ of the pumps enter a large main water-supply tank $d$, and their outlet-pipes $e$ and $f$, respectively, are provided with check-valves $g$ and $h$, respectively, and are connected to a common pipe $i$, this pipe $i$ being provided with suitable stop-cocks or valves $j$, $k$, and $l$, the connecting-pipe $f$ being provided with an additional valve $m$. The pump $b$ is also connected to an adjacent water-supply by means of a pipe $n$, which is provided with a cock $o$ and check-valve $p$.

One end of pipe $i$ enters a main storage or pressure tank $q$, and its other end empties into an elevated tank $r$, and said pipe is provided near reservoir $q$ with a check-valve $s$. The pressure-tank $q$ is connected by a pipe $t$ with tank $d$ and is provided with a pressure-regulator $u$, whereby excess of pressure in tank $q$ will automatically relieve itself and empty the water into tank $d$. The exit-pipe $v$ from tank $q$ is provided with a pressure-regulator or reducing-valve $w$ and is connected at its other end to pipe $i$, a suitable stop-cock $x$ being inserted in pipe $v$ near where it enters said pipe $i$. Connected to the pipe $v$ at intervals are a series of two or more auxiliary pressure-tanks $y$, each connected by an independent pipe provided with check-valves $z$ and $a'$, respectively. These auxiliary tanks are provided with valved exit-nozzles $b'$, adapted to direct a jet of water under pressure upon small water-wheels or turbines $c'$, the water from these wheels being received in a tank $d'$, provided at one end with a spout which directs the water upon a large water-wheel $f'$, journaled below storage-tank $r$ and above supply-tank $d$, into which latter tank the water from the large water-wheel is emptied after it has spent its force of gravity upon said wheel.

The pressure-regulator or reducing-valve $w$ is set to close when a predetermined pressure has been reached in the tanks $y$ and prevent the further passage of water to said tanks until the pressure therein has been reduced. By this means the pressure in the auxiliary tanks $y$ will be maintained uniform as long as the pressure in the main tank is equal to or exceeds the predetermined pressure in the auxiliary tanks, while the pressure in the main tank may vary with the varying power of the motor operating the pumps. By this means wheel $c'$ will be driven by a uniform power.

The storage-tank $r$ is provided with a depending valved nozzle $g'$, adapted to direct the water from said tank into water-wheel $f'$, and the valve in nozzle $g'$ is automatically controlled by a governor $h'$, operated from the shaft of the water-wheel, whereby the speed of the water-wheel will automatically regulate the quantity of the water from tank $r$.

The shafts of the small water-wheel $c'$ and large wheel $f'$ may be connected up to a common shaft $i'$ by suitable belts $j'$, the main shaft being provided with suitable clutches $k'$, whereby any one or all of said water-wheels may be disconnected from the main shaft. It is evident, however, that the shafts of the various wheels may be used independently or connected up to other power-transmitting apparatus.

The reducing-valve $w$ may be of any desired construction. As shown in the drawings, it comprises a reciprocating valve $e''$, adjustably connected to a diaphragm $c''$ by a central stem $d''$. Bearing on the center of this stem is a rod $b''$, carried by the short arm of a lever $a''$, upon the long arm of which an adjustable weight is mounted. When the desired pressure in the tanks $y$ is reached, the diaphragm $c''$ is depressed and valve $e''$ closed. By means of the weight on lever $a''$ this valve may be caused to close at any desired pressure.

This hydraulic system is especially designed for use in connection with a wave-motor of the class covered by my Patent No. 616,615, granted December 27, 1898, in which, of course, the power that can be utilized varies very greatly as the activity of the waves varies. In connection with motors, such as wave-motors, where the supply of energy so greatly and constantly varies, it is especially necessary that means be provided which will store up and utilize to the greatest possible extent this constantly-varying force, the apparatus requiring to adjust itself instantly and utilize to the fullest extent the minimum of energy to be obtained from the wave, as well as the maximum of energy to be obtained therefrom. It is believed that in my present invention I have provided an apparatus that will thus provide for the storing up of the surplus of the waves, to be utilized when they become too quiet to afford the desired average of power, whereby the power supplied to the transmitting machinery will be substantially uniform should it be desired to impart all the power to a single shaft or machine.

It will be observed that pump $b$ not only serves to supply through pipe $n$ the proper amount of water for the proper working of the system, but also is adapted to lend its aid to main pump $a$ in filling tank $r$ and keeping up the pressure in the several pressure-tanks. While two pumps are desirable when a motor of the variety shown in my former patent is employed, it is of course understood that a single pump may be employed, if desired. It will also be observed that any number of auxiliary pressure-tanks may be employed, according to the nature of the natural body of water whose waves the apparatus is designed to utilize. It will be observed that by the system of pipes and valves shown all the power may be applied to the main water-wheel $f$ or it may be distributed to the series of auxiliary water-wheels, as occasion may require.

Having thus fully described my invention, what I claim, and desire to secure by Letters Patent, is—

1. In a hydraulic apparatus, the combination of a pressure-tank, a force-pump for forcing water thereinto, a valved nozzle connected to said tank, an auxiliary water-wheel adjacent said nozzle, a tank to receive the spent water for said auxiliary wheel, a main water-wheel adapted to receive the water from said tank, a storage-tank above said main water-wheel, a valved outlet from the tank to the main water-wheel, a governor operated by the water-wheel and controlling the valved outlet from the storage-tank, a valved pipe connecting the storage-tank to the pump, whereby the storage-tank may be supplied from the pump and the pressure kept up in the pressure-tank by the pump and whereby also the valved outlet of the storage-tank will be automatically opened when the spent water is insufficient to operate the main water-wheel at the desired speed, making up the deficiency from said storage-tank.

2. In combination a main water-supply, a pump connected thereto, a main pressure-tank connected to said pump by valved piping, a storage-reservoir $r$ connected to the pump by valved piping, a series of auxiliary pressure-tanks connected to the main pressure-tank, an automatic regulator or pressure-reducing valve between the main and auxiliary pressure-tanks to maintain a uniform pressure in the auxiliary tanks, water-wheels adapted to be operated by the auxiliary tanks, a main water-wheel, and means adapted to convey the waste water from the auxiliary wheels to said main wheel.

3. The combination of a main water-supply tank, a main pump connected thereto, an auxiliary pump connected to said tank and to a source of supply, a pressure-tank $q$, a storage-tank $r$, valved piping connecting said tanks to both pumps, a pipe $v$ connecting the tank $q$ to tank $r$, a series of auxiliary pressure-tanks connected to pipe $v$, a water-wheel for each of said tanks, a main water-wheel, means for conveying the waste water from the auxiliary wheels to the main wheel, a valved outlet from the tank $r$, and means operated by the main water-wheel to control said valved outlet, whereby when the volume of waste water from the auxiliary water-wheels is not sufficient to drive the main wheel at the desired speed water will flow from the tank $r$ to said wheel.

In testimony whereof I hereunto affix my signature, in the presence of two witnesses, this 20th day of February, 1899.

FERDINAND J. HAGEN.

Witnesses:
WILLIAM GOTTGETREN,
NATHAN WEISS.